United States Patent
Valente et al.

(10) Patent No.: US 10,012,300 B2
(45) Date of Patent: Jul. 3, 2018

(54) CLUTCHED COMPONENT

(71) Applicant: American Axle & Manufacturing, Inc., Detroit, MI (US)

(72) Inventors: Paul J. Valente, Berkley, MI (US); James P. Downs, South Lyon, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 344 days.

(21) Appl. No.: 14/810,502

(22) Filed: Jul. 28, 2015

(65) Prior Publication Data

US 2016/0033025 A1 Feb. 4, 2016

Related U.S. Application Data

(60) Provisional application No. 62/032,784, filed on Aug. 4, 2014.

(51) Int. Cl.
*F16H 48/24* (2006.01)
*F16H 48/08* (2006.01)

(52) U.S. Cl.
CPC .............. *F16H 48/24* (2013.01); *F16H 48/08* (2013.01)

(58) Field of Classification Search
None
See application file for complete search history.

(56) References Cited

U.S. PATENT DOCUMENTS

| | | | | |
|---|---|---|---|---|
| 751,787 | A | * 2/1904 | Entriken | ............ F16H 3/50 475/308 |
| 964,387 | A | * 7/1910 | Burnam | ............ F16H 48/30 475/237 |
| 1,723,901 | A | * 8/1929 | Todd | ............ F16H 48/08 475/237 |
| 2,038,986 | A | 4/1936 | Browne | |
| 2,121,254 | A | * 6/1938 | Meinke | ............ F16H 48/08 475/237 |
| 3,105,394 | A | * 10/1963 | Salzmann | ............ F16H 48/08 192/56.61 |
| 3,480,310 | A | 11/1969 | McElwain | |
| 3,679,244 | A | 7/1972 | Reddy | |
| 3,747,966 | A | 7/1973 | Wilkes et al. | |
| 3,922,005 | A | 11/1975 | Bundschuh | |

(Continued)

FOREIGN PATENT DOCUMENTS

| CN | 2381843 Y | 6/2000 |
|---|---|---|
| CN | 102312984 A | 1/2012 |

(Continued)

OTHER PUBLICATIONS

First Office Action issued by Chinese International Patent Office in Application No. 201510471004.2, dated Jun. 28, 2017.

*Primary Examiner* — Dirk Wright
(74) *Attorney, Agent, or Firm* — Harness, Dickey & Pierce, P.L.C.

(57) ABSTRACT

The present teachings provide for a clutched component including a first member, a second member, and a clutch. The first member can have an output portion. The second member can have an input portion that is disposed within the output portion. The clutch can include a plurality of first lock members and a control member for coordinating radially inward movement of the first lock members to drivingly couple the output portion and the input portion.

52 Claims, 4 Drawing Sheets

(56) References Cited

U.S. PATENT DOCUMENTS

| | | | |
|---|---|---|---|
| 4,043,224 A * | 8/1977 | Quick | F16H 48/08 |
| | | | 475/237 |
| 5,255,714 A | 10/1993 | Mullins | |
| 5,577,859 A | 11/1996 | Nau | |
| 6,447,397 B1 | 9/2002 | Jaeger et al. | |
| 6,520,305 B2 | 2/2003 | Dick | |
| 6,959,799 B2 | 11/2005 | Fusegi et al. | |
| 7,375,509 B2 | 5/2008 | Meaney | |
| 7,758,462 B2 * | 7/2010 | Veldman | B60K 17/16 |
| | | | 192/69.62 |
| 7,892,133 B2 * | 2/2011 | Lubben | F16H 48/08 |
| | | | 475/231 |
| 8,100,805 B2 * | 1/2012 | Dayton | B60K 23/04 |
| | | | 475/150 |
| 2010/0093481 A1 | 4/2010 | Lyman | |
| 2010/0179736 A1 | 7/2010 | Johnson et al. | |
| 2012/0251230 A1 | 10/2012 | Degner et al. | |

FOREIGN PATENT DOCUMENTS

| | | | |
|---|---|---|---|
| CN | 202215702 U | 5/2012 | |
| DE | 102015112747 A1 * | 2/2016 | F16H 48/24 |
| JP | 2010242957 A | 10/2010 | |

* cited by examiner

CLUTCHED COMPONENT

CROSS-REFERENCE TO RELATED APPLICATIONS

This application claims the benefit of U.S. Provisional Application No. 62/032,784, filed on Aug. 4, 2014, the entire disclosure of which is incorporated herein by reference.

FIELD

The present disclosure relates to a clutched component.

BACKGROUND

This section provides background information related to the present disclosure which is not necessarily prior art.

It is known in the art to use a clutch to selectively transmit rotary power through a driveline component or to lock driveline components to one another to inhibit relative rotation. In the context of a differential assembly, it is relatively common for such clutches to employ a locking dog that is moveable axially along a rotational axis of a differential case. While driveline components having a clutch configured in the above-described manner are suited for their intended purpose, such driveline components are nevertheless susceptible to improvement.

SUMMARY

This section provides a general summary of the disclosure, and is not a comprehensive disclosure of its full scope or all of its features.

The present teachings provide for a driveline component including a differential, and a lock. The differential can include an outer differential case, a side gear, and a first rotating member. The outer differential case can be configured for rotation about a first axis and can define a plurality of circumferentially spaced apart first passages. The first rotating member can be coupled to the side gear for common rotation about the first axis. The first rotating member can define a plurality of first cavities radially inward of the first passages. The lock can have a plurality of first locking elements and a sleeve. The plurality of first locking elements can be received in the plurality of first passages. The sleeve can be disposed about the outer differential case and can be slidable along the first axis between a first sleeve position and a second sleeve position. When the sleeve is in the first sleeve position, the sleeve holds the plurality of first locking elements in engagement with the plurality of first cavities to non-rotatably couple the outer differential case to the first rotating member. When the sleeve is in the second sleeve position, the sleeve allows the plurality of first locking elements to disengage the plurality of first cavities to allow relative rotation of the outer differential case and first rotating member.

The present teachings further provide for a driveline component including a first differential case, a pair of output members, a differential gearset, and a clutch. The first differential case can have an output portion and an input portion. The differential gearset can be configured to transmit rotary power between the first differential case and the output members. The clutch can include a plurality of first lock members and a control member for coordinating radially inward movement of the first lock members to non-rotatably couple the output portion to one of the pair of output members.

The present teachings further provide for a clutched component including a first member, a second member, and a clutch. The first member can have an output portion. The second member can have an input portion that is disposed within the output portion. The clutch can include a plurality of first lock members and a control member for coordinating radially inward movement of the first lock members to drivingly couple the output portion and the input portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure is directed to a driveline component for use in a motor vehicle. More specifically, a power transfer device, such as a differential, having a locking mechanism for locking relative rotation of output shafts of the differential.

Figure 1:
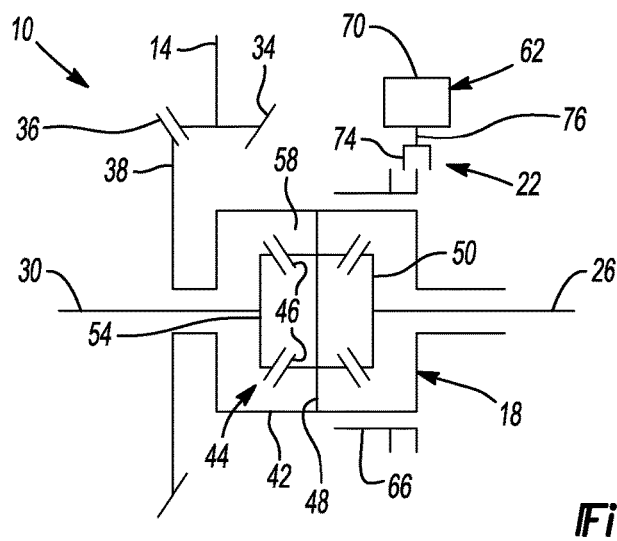
FIG. 1 is a schematic view of a portion of a driveline having a driveline component with a differential assembly and a locking device that are constructed in accordance with the present teachings.
Figure 2:
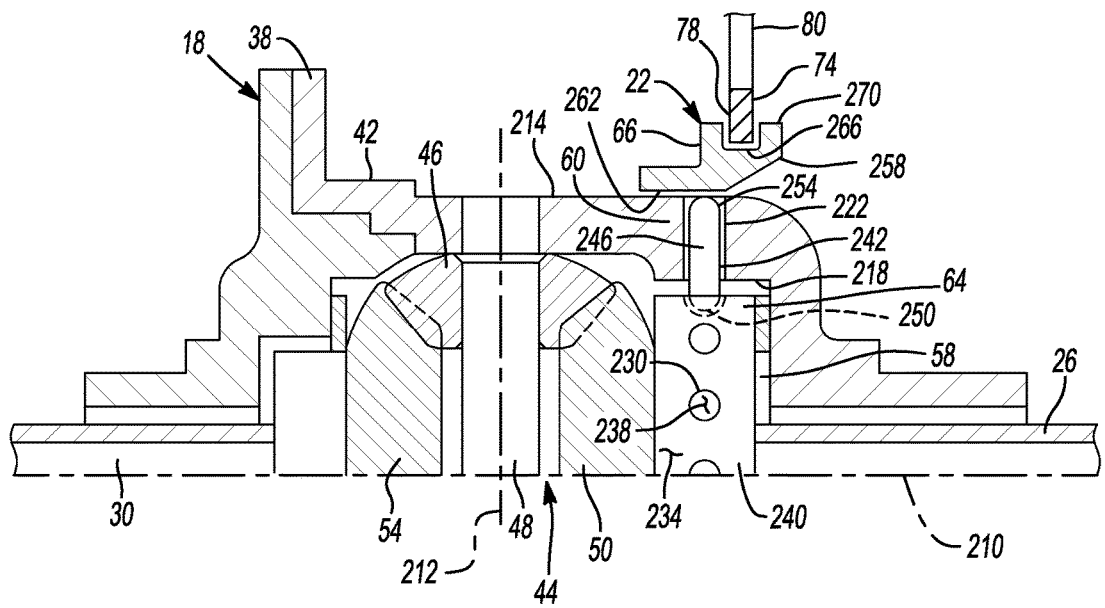
FIG. 2 is a section view of a portion of the driveline component of FIG. 1 illustrating the differential assembly and the locking device in more detail.

With reference to FIGS. 1 and 2, a drivetrain component constructed in accordance with the teachings of the present disclosure is generally indicated by reference numeral 10. The drivetrain component 10 can include an input shaft 14, a differential 18, a clutch, or locking device 22, a first output shaft 26, and a second output shaft 30. The input shaft 14 can receive rotational power from any suitable means, such as a power plant of a vehicle (not shown). Rotary power can be transmitted between the input shaft 14 and the differential 18 in any desired manner. For example, the input shaft 14 can include an input pinion 34 that can be meshingly engaged to a ring gear 36 that can be coupled to a portion 38 of the differential 18 such that rotation of the input shaft 14 causes corresponding rotation of the differential 18.

The differential 18 can include a differential case 42, first and second output members 26 and 30, respectively, and a means for transmitting rotary power between the differential case 42 and the first and second output members 26 and 30. In the particular example provided, the power transmitting means comprises a differential gearset 44 having a plurality of pinion gears 46, a cross-pin 48, a first side gear 50 and a second side gear 54. Those of skill in the art will appreciate, however, that other types of power transmitting means may be employed, including one or more clutches and/or viscous couplings.

The pinion gears 46 can be disposed within an inner cavity 58 of the differential case 42 and can be rotatably mounted to the differential case 42. The pinion gears 46 can be rotatably coupled to the cross-pin 48, which can be coupled to the differential case 42. The pinion gears 46 can be meshingly engaged with the first and second side gears 50, 54. The first side gear 50 can be disposed within the differential case 42 and can be fixed for rotation with the first output shaft 26. The first output shaft 26 can be rotatably supported by the differential case 42 and can extend outward therefrom. The first output shaft 26 can be configured to provide torque to additional drivetrain components, such as a first vehicle wheel (not shown) for example.

The second side gear 54 can be disposed within the differential case 42 and can be fixed for rotation with the second output shaft 30. The second output shaft 30 can be rotatably supported by the differential case 42 and can extend outward therefrom, from an opposite side of the differential case 42 as the first output shaft 26. The second output shaft 30 can be configured to provide torque to additional drivetrain components, such as a second vehicle wheel (not shown) for example.

The locking device 22 can include an actuating mechanism 62, a sleeve 66, a first locking portion 60, a second locking portion 64 and a plurality of locking elements 242. The actuating mechanism 62 can be any type of device that is configured to cause linear motion of the sleeve 66. In the example provided, the actuating mechanism 62 includes an actuator 70 and a shift fork 74. The actuator 70 can be any type of linear motor, such as a fluid-powered cylinder, a screw actuator, or a solenoid for example, and can include an actuator output member 76 that is movable along an axis that is parallel to the rotational axis of the differential case 42.

The shift fork 74 can have a collar 78 and an arm 80. The arm 80 can be coupled for axial translation with the actuator output member 76. The collar 78 can extend into and engage with a shift groove 266 formed in the sleeve 66, to couple the sleeve 66 for axial translation with the shift fork 74. The shift groove 266 can extend circumferentially around the sleeve 66, and can extend around the entire circumference of the sleeve 66. The collar 78 can generally be a ring, or "C" shaped body configured to be received in the shift groove 266 around at least a portion of the circumference of the shift groove 266.

Figure 3:
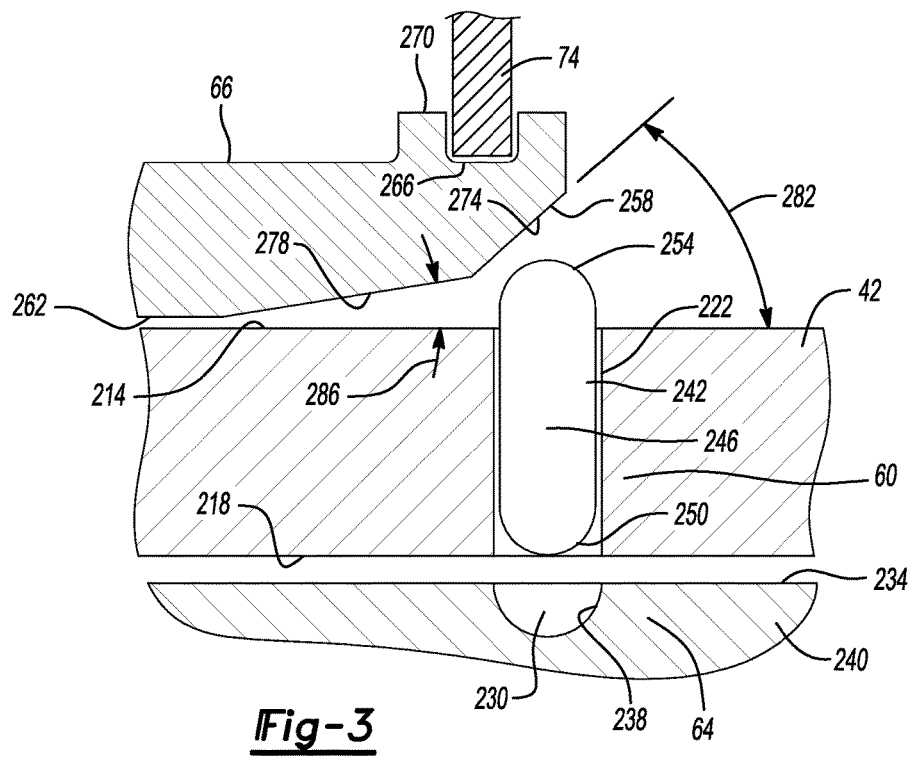
FIG. 3 is an enlarged view of a portion of the driveline component of FIG. 2.

With reference to FIGS. 2 and 3, the differential 18 and locking device 22 are shown in more detail. The differential 18 and locking device 22 are substantially symmetrical about axis 210, and as such only the top half is illustrated. The pinion gears 46 can rotate about axis 212, which can be perpendicular to axis 210. The first locking portion 60 can have an outer surface 214 and an inner surface 218, and can define a plurality of radially extending bores 222. In the example provided, the first locking portion 60 is integrally formed with the differential case 42 and the inner surface 218 defines the inner cavity 58. The bores 222 can penetrate the inner surface 218 and can penetrate the outer surface 214, to extend between the inner cavity 58 and the outer surface 214. The plurality of bores 222 can be spaced around the circumference of the first locking portion 60.

The second locking portion 64 can define a plurality of cavities, or recesses 230 formed in an outer surface 234 of the second locking portion 64. The recesses 230 can extend radially inward from the outer surface 234, and can be spaced around the circumference of the second locking portion 64. The recesses 230 can have an angled, or rounded inner surface 238. It is understood that the recesses 230 can alternatively be bores, or holes in, or through the second locking portion 64. In the example provided, the second locking portion 64 is integrally formed with a rotating member 240, non-rotatably coupled to the first side gear 50. It is understood that the rotating member 240 can be integrally formed with the first side gear 50. Alternatively, it is understood that the rotating member 240 can be integrally formed with the first output shaft 26, as the first output shaft 26 is non-rotatably coupled to the first side gear 50.

The number of locking elements 242 can generally equal the number of bores 222 and each of the locking elements 242 can be slidably received within a respective one of the bores 222. The locking elements 242 can have a generally cylindrically shaped body 246 and can have angled, or rounded inner and outer ends 250, 254. Inner end 250 can be configured to be received in a respective one of the recesses 230. The bores 222 can also be configured to retain the locking elements 242 within the bores 222, regardless of the position of the sleeve 66 along the differential case 42, which will be described below.

The sleeve 66 can include a cam surface 258 and a sliding surface 262 and can define the shift groove 266. The shift groove 266 can be formed on an outer radial surface 270 of the sleeve 66 and can be configured to couple the sleeve 66 to the shift fork 74. The sleeve 66 can be coupled to the differential case 42, such that linear motion of the shift fork 74 in the axial direction causes the sliding surface 262 of the sleeve 66 to slide along the outer surface 214 of the differential case 42. The sleeve 66 can slide between a first, or locked position (FIG. 2), and a second, or unlocked position (FIG. 3).

In the locked position, the sleeve 66 can cover the bores 222 to prevent the locking elements 242 from moving radially outward. In the locked position, the inner end 250 of each locking element 242 is received in a respective one of the recesses 230 and the sleeve 66 holds the locking elements 242 in engagement with the recesses 230. In the locked position, the locking elements 242 prevent relative rotation of the differential case 42 and the first side gear 50. Thus, in the locked position, the differential 18 is locked and the first and second output shafts 26, 30 rotate at the same speed.

It is understood that the number of recesses 230 can be equal to, or greater than the number of bores 222 to allow the locking elements 242 to lock the first side gear 50 at various rotational angles. It is also understood that the actuator 70 can be spring loaded, or compliant to accommodate a situation where the locking elements 242 are not aligned with the recesses 230.

In the unlocked position (FIG. 3), the sleeve 66 is moved such that the locking elements 242 can slide in the radially outward direction to disengage the plurality of recesses 230. Centrifugal force caused by the rotation of the differential case 42, and thus rotation of the locking elements 242, can cause the locking elements 242 to move radially outward to disengage the recesses 230.

Additionally, or alternatively, the inner surfaces 238 of the recesses 230 can be configured to be cam surfaces and the inner ends 250 of the locking elements 242 can be configured to be follower surfaces that cooperate with the inner surfaces 238 of the recesses 230 to provide a radially outward force on the locking elements 242. This radially outward force can cause the locking elements 242 to slide radially outward to disengage the recesses 230, when torque is applied to the differential case 42. The locking elements 242 can alternatively be biased in the radially outward direction by a biasing member (not shown).

The cam surface 258 of the sleeve 66 can be smooth to engage the outer end 254 of the locking elements 242, which can act as follower members. The cam surface 258 and the outer end 254 can be rounded, or angled. In the example provided, cam surface 258 is angled and has a first portion 274 and a second portion 278. The first portion 274 is configured to form a first angle 282 relative to the differential case 42, and the second portion 278 is configured to form a second angle 286 relative to the differential case 42. The first angle 282 can be configured to provide optimal radially inward force on the locking elements 242 to require minimal linear force on the sleeve 66 when moving the sleeve 66 from the unlocked position to the locked position.

The second angle 286 can be configured to ease the transition from the locked position to the unlocked position, when under load. In the example provided, the sliding surface 262 of the sleeve 66 covers the bores 222 when in the locked position. In this configuration, the sleeve requires little or no force to remain in the locked position.

Alternatively, the second portion 278 can cover the bores 222 in the locked position. In this configuration, the second angle 286 and rotational torque provided to the differential case 42 dictates the amount of force required to maintain the locked position. Thus, a predetermined torque load can cause the inner surfaces 238 of the recesses 230 to encourage the locking elements 242 to move radially outward, causing the sleeve 66 to move to the unlocked position when the second portion 278 covers the bores 222. It is also understood that the first angle 282 and second angle 286 can be configured to be equal such that the cam surface 258 forms a single plane.

Figure 4:
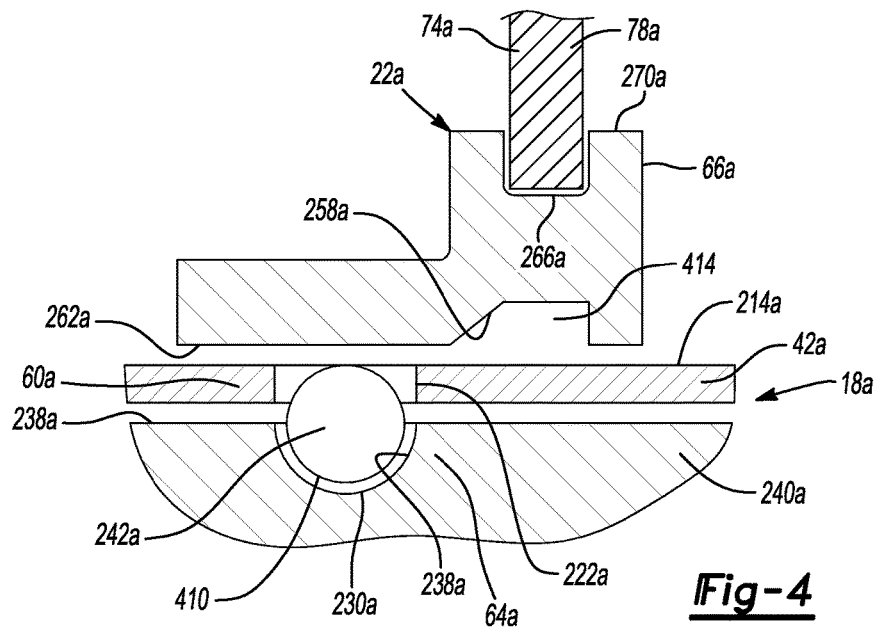
FIG. 4 is a view similar to that of FIG. 3 but illustrating an alternately constructed locking device.

With reference to FIG. 4, another configuration of the differential 18 and locking device 22 is shown in the locked position and indicated with reference to differential 18a and locking device 22a. In this configuration, the structure of the differential 18a and locking device 22a can be generally similar to differential 18 and locking device 22, shown and described with reference to FIG. 2, with like reference numerals referring to like elements. As such, only the differences will be described in detail.

In this configuration, locking elements 242a can have a spherical shaped body 410 and recesses 230a can be configured to receive a portion of the spherical shaped body 410. In the locked position, sliding surface 262a of sleeve 66a can block bores 222a to hold the locking elements 242a in engagement with second locking portion 64a to prevent relative rotation between the second locking portion 64a and first locking portion 60a.

Sleeve 66a can also define a pocket 414 along sliding surface 262a, extending radially outward therefrom that aligns with the bores 222a when in the unlocked position. The pocket 414 can be configured to receive a portion of spherical shaped body 410, to allow the locking elements 242a to disengage the recesses 230a, when sleeve 66a is in the unlocked position. In this way, the pocket 414 can retain, or encapsulate the locking elements 242a in the unlocked position. Pocket 414 can include cam surface 258a, which can be substantially similar to cam surface 258 as described above. It is understood that the pocket 414 can be a single pocket extending circumferentially around the sleeve 66a, within which all of the plurality of locking elements 242a can be received, or the pocket 414 can consist of a plurality of individual pockets, each aligned with a respective one of bores 222a for receiving a respective one of the locking elements 242a. It is also understood that a pocket similar to pocket 414 can be used to retain, or encapsulate the cylindrical locking elements 242 of the configuration shown and described with reference to FIG. 2, in the unlocked position.

Figure 5:
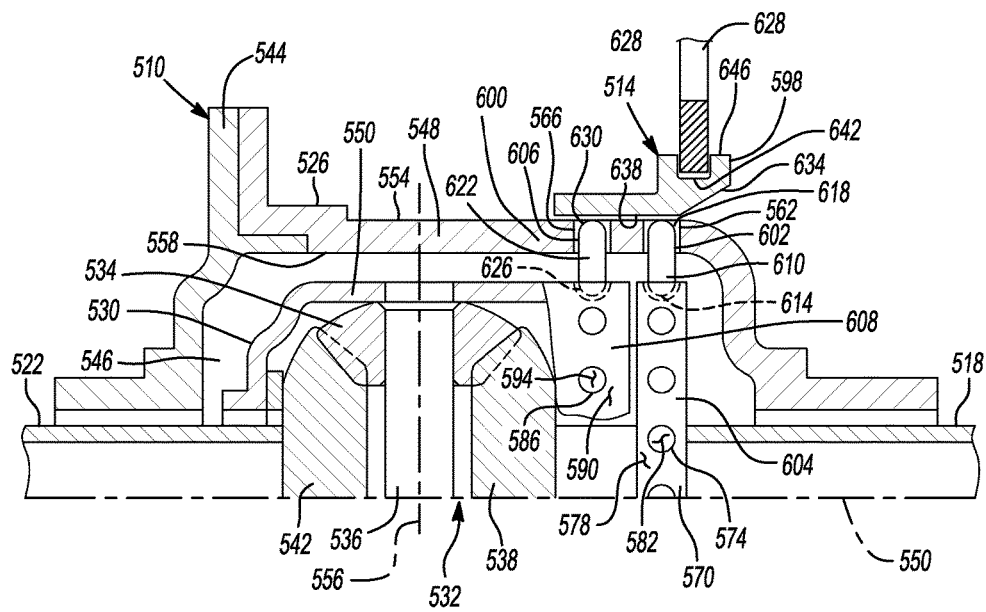
FIG. 5 is a section view of a portion of another driveline component having a differential assembly and a locking device that are constructed in accordance with the present teachings.

With reference to FIG. 5, another configuration of a differential 510 is shown with a locking device 514, a first output shaft 518, and a second output shaft 522. Differential 510 can be a "free differential", having an outer case 526, an inner case 530, and a means for transmitting rotary power between the inner case 530 and the first and second output shafts 518 and 522. In the particular example provided, the power transmitting means comprises a differential gearset 532 having a plurality of pinion gears 534, a cross-pin 536, a first side gear 538 and a second side gear 542. Those of skill in the art will appreciate, however, that other types of power transmitting means may be employed, including one or more clutches and/or viscous couplings.

The outer case 526 can receive rotational input similar to differential case 42, and can include an input portion 544, and an output portion 548. The input portion 544 can be non-rotatably coupled to a ring gear (not shown) similar to ring gear 36 that can be non-rotatably coupled to the outer case 526. The inner case 530 can be disposed within an inner cavity 546 of the outer case 526 and can be rotatably coupled to the output portion 548 of the outer case 526 for rotation about axis 550. The inner case 530 can have an input portion 552 disposed within the output portion 548 of the outer case 526.

The pinion gears 534 can be rotatably mounted within the inner case 530 for rotation with the input portion 552 about axis 556. Axis 556 can be perpendicular to axis 550. The pinion gears 534 can be rotatably coupled to the cross-pin 536, which can be coupled to the inner case 530. The pinion gears 534 can be meshingly engaged with the first and second side gears 538, 542.

The first side gear 538 can be disposed within the inner case 530 and can be fixed for rotation with the first output shaft 518. The first output shaft 518 can be rotatably supported by either, or both of the outer and inner cases 526, 530 and can extend outward from the outer case 526. The first output shaft 518 can be configured to provide torque to additional drivetrain components, such as a first vehicle wheel (not shown) for example.

The second side gear 542 can be disposed within the inner case 530 and can be fixed for rotation with the second output shaft 522. The second output shaft 522 can be rotatably supported by either, or both of the outer and inner cases 526, 530 and can extend outward from the outer case 526, from an opposite side of the outer case 526 as the first output shaft 518. The second output shaft 522 can be configured to provide torque to additional drivetrain components, such as a second vehicle wheel (not shown) for example.

The locking device 514 can be substantially similar to locking device 22, and can include an actuating mechanism (not shown), a sleeve 598, a first locking portion 600, a second locking portion 604, a third locking portion 608, a plurality of first locking elements 602, and a plurality of second locking elements 606.

The first locking portion 600 can have an outer surface 554 and an inner surface 558, and can define a plurality of radially extending first bores 562 and a plurality of radially extending second bores 566. In the example provided, the first locking portion 600 is integrally formed with the outer case 526, and the inner surface 558 can define the inner cavity 546. The first bores 562 can penetrate the inner surface 558 and can penetrate the outer surface 554, to extend between the inner cavity 546 and the outer surface 554. The plurality of first bores 562 can be spaced around the circumference of the first locking portion 600.

The second locking member 604 can define a plurality of first cavities, or recesses 574 formed in an outer surface 578 of the second locking member 604. The first recesses 574 can extend radially inward from outer surface 578, and can be spaced around the circumference of the second locking portion 604. The first recesses 574 can have an angled, or rounded inner surface 582. It is understood that the first recesses 574 can alternatively be bores, or holes in, or through the second locking portion 604. In the example provided, the second locking portion 604 is integrally formed with a rotating member 570, non-rotatably coupled to the first side gear 538. It is understood that the rotating member 570 can be integrally formed with the first side gear 538.

Alternatively, it is understood that the rotating member 570 can be integrally formed with the first output shaft 518, as the first output shaft 518 is non-rotatably coupled to the first side gear 538. It is also understood that the number of first recesses 574 can be equal to, or greater than the number of first bores 562 to allow the first side gear 538 to lock at various rotational positions.

The second bores 566 can penetrate inner surface 558 and can penetrate outer surface 554, to extend between the inner cavity 546 and the outer surface 554 of the first locking portion 600. The plurality of second bores 566 can be spaced around the circumference of the first locking portion 600.

The third locking portion 608 can define a plurality of second cavities, or recesses 586 formed in an outer surface 590 of the third locking portion 608. The second recesses 586 can extend radially inward from outer surface 590, and can be spaced around the circumference of the third locking portion 608. The second recesses 586 can have an angled, or rounded inner surface 594. It is understood that the second recesses 586 can alternatively be bores, or holes in, or through the third locking portion 608. It is understood that the number of second recesses 586 can be equal to, or greater than the number of second bores 566 to allow the third locking portion 608 to lock at various rotational positions. In the example provided, the third locking portion 608 is integrally formed with the inner case 530.

The number of first locking elements 602 can generally equal the number of first bores 562 and each of the first locking elements 602 can be slidably received within a respective one of the first bores 562. The first locking elements 602 can have a generally cylindrically shaped body 610 and can have angled, or rounded inner and outer ends 614, 618. Inner end 614 can be configured to be received in a respective one of the first recesses 574. The first bores 562 can also be configured to retain the first locking elements 602 within the first bores 562.

The number of second locking elements 606 can generally equal the number of second bores 566 and each of the second locking elements 606 can be slidably received within a respective one of the second bores 566. The second locking elements 606 can have a generally cylindrically shaped body 622 and can have angled, or rounded inner and outer ends 626, 630. Inner end 626 can be configured to be received in a respective one of the second recesses 586. The second bores 566 can also be configured to retain the second locking elements 606 within the second bores 566. It is understood that either, or both of the first and second locking elements 602, 606 can alternatively be spherical in shape similar to locking elements 242a shown and described with regard to FIG. 4.

The sleeve 598 can be substantially similar to sleeve 66. The sleeve 598 can be axially translated by the actuating mechanism (not shown) similar to actuating mechanism 62, having a shift fork 628 similar to shift fork 74. The sleeve 598 can be disposed about the outer case 526 and slidably coupled to the outer case 526. In operation, the sleeve 598 can be actuated in a manner similar to sleeve 66 to move along the outer case 526.

The sleeve 598 can include a cam surface 634 and a sliding surface 638 and can define a shift groove 642. The shift groove 642 can be formed on an outer radial surface 646 of the sleeve 598, similar to shift groove 266, and can be configured to couple the sleeve 598 to the shift fork 628 for axial translation with the shift fork 628. The sleeve 598 can be coupled to the outer case 526, such that linear force received from the actuating mechanism in the axial direction causes the sliding surface 638 of the sleeve 598 to slide along the outer surface 554 of the outer case 526.

The sleeve 598 can slide between a first, or locked position (FIG. 5), a second, or unlocked position, and a third, or disconnected position. In the locked position, the sleeve 598 can cover the first and second bores 562, 566 to prevent the first and second locking elements 602, 606 from moving radially outward. In the locked position, the inner end 614 of each first locking element 602 is received in a respective one of the first recesses 574, and the inner end 626 of each second locking element 606 is received in a respective one of the second recesses 586. The sleeve 598 holds the first locking elements 602 in engagement with the first recesses 574 and the second locking elements 606 in engagement with the second recesses 586. In the locked position, the second locking elements 606 prevent relative rotation of the outer and inner cases 526, 530, while the first locking elements 602 prevent relative rotation of the outer case 526 and the first side gear 538. Thus, in the locked position, the differential 510 is locked and the first and second output shafts 518, 522 rotate at the same speed.

In the unlocked position, the sleeve 598 is moved such that the first locking elements 602 can slide in the radially outward direction to disengage the plurality of first recesses 574. Centrifugal force caused by the rotation of the outer case 526, and thus rotation of the first locking elements 602, can cause the first locking elements 602 to move radially outward to disengage the first recesses 574.

Additionally, or alternatively, the inner surfaces 582 of the first recesses 574 can be configured to cooperate with the inner ends 614 of the first locking elements 602 to provide a radially outward force on the first locking elements 602. This radially outward force can cause the first locking elements 602 to slide radially outward to disengage the first recesses 574, when torque is applied to the outer case 526. The first locking elements 602 can alternatively be biased in the radially outward direction by a biasing member (not shown). In the unlocked position, the sleeve 598 can cover the second bores 566 to prevent the second locking elements 606 from moving radially outward, to maintain engagement between the second locking elements 606 and the second recesses 586, as otherwise described above. In the unlocked position, the differential 510 can operate as a typical open differential.

In the disconnected position, the sleeve 598 is moved such that the second locking elements 606 can slide in the radially outward direction to disengage the plurality of second recesses 586. Centrifugal force caused by the rotation of the outer case 526, and thus rotation of the second locking elements 606, can cause the second locking elements 606 to move radially outward to disengage the second recesses 586.

Additionally, or alternatively, the inner surfaces 594 of the second recesses 586 can be configured to cooperate with the inner ends 626 of the second locking elements 606 to provide a radially outward force on the second locking elements 606. This radially outward force can cause the second locking elements 606 to slide radially outward to disengage the second recesses 586, when torque is applied to the outer case 526. The second locking elements 606 can alternatively be biased in the radially outward direction by a biasing member (not shown). In the disconnected position, sleeve 598 can be positioned such that the first locking elements 602 can also slide in the radially outward direction to disengage the plurality of first recesses 574 as otherwise described above. In the disconnected position, the output shafts 518, 522 can be disconnected so as to not receive torque from the outer case 526.

The cam surface 634 of the sleeve 598 can be substantially similar to the cam surface 258 shown and described with respect to FIG. 3 and can act on both the first and second locking elements 602, 606 in a similar manner.

Figure 6:
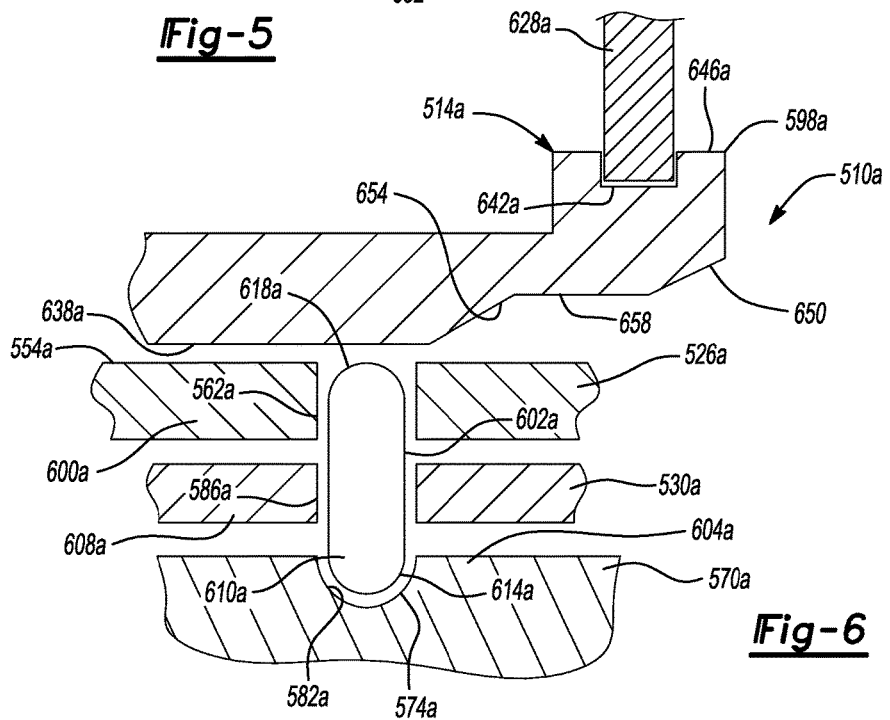
FIG. 6 is an enlarged portion of another construction of the locking device of FIG. 5.

FIG. 6 shows another construction of a differential 510a and locking device 514a. The structure of differential 510a and locking device 514a is generally similar to differential 510 and locking device 514, shown and described with reference to FIG. 5, with like reference numerals referring to like elements. As such, only the differences will be described in detail. In this construction, the sleeve 598a can include a first cam surface 650, a second cam surface 654, and a lock surface 658.

The first cam surface 650 can be radially outward of the second cam surface 654. The lock surface 658 can be radially and axially between the first and second cam surfaces 650, 654, to connect the first and second cam surfaces 650, 654. Each of the first and second cam surfaces 650, 654 can be substantially similar to the cam surface 634 of sleeve 598, and can act on locking elements 602a in a similar manner. Locking elements 602a can be radially movable between a first radial position, a second radial position, and a third radial position, the first radial position being shown in FIG. 6.

In the first radial position, the locking elements 602a are received through the second cavities 586a of the third locking portion 608a, and held in engagement with the first cavities 574a of the second locking portion 604a. The second cavities 586a can be cylindrical in shape. Alternatively, the second cavities 586a can be elongated circumferentially, similar to the recesses 714, 714a described below with reference to FIGS. 7-9, to allow for lash between the locking elements 602a and the second cavities 586a.

The locking elements 602a are held in the first radial position by the sliding surface 638a, or can be held in this position by a portion of the second cam surface 654 in a similar manner to that described with reference to FIG. 3. In this position, the locking elements 602a non-rotatably couple the third locking portion 608a to the first locking portion 600a, and non-rotatably couple the third locking portion 608a to the second locking portion 604a.

In the second radial position, the sleeve 598a is translated axially, such that the locking elements 602a are free to move radially outward from the first radial position. In the second radial position, the locking elements 602a are prevented from moving farther in the radially outward direction by the locking surface 658. In this position, the second locking portion 604a is free to rotate relative to the third locking portion 608a, but the third locking portion 608a remains non-rotatably coupled to the first locking portion 600a.

In the third radial position, the sleeve 598a is translated axially, such that the locking elements 602a are free to move radially outward from the second radial position. In the third radial position, the second locking portion 604a is free to rotate relative to the third locking portion 608a, and the third locking portion 608a is free to rotate relative to the first locking portion 600a. In the example provided, the first locking portion 600a is integrally formed with the outer case 526a, the second locking portion 604a is integrally formed with the rotating member 570a, and the third locking portion 608a is integrally formed with the inner case 530a. While the locking surface 658 is shown parallel to the sliding surface 638a, it is understood that the locking surface 658 can be curved or angled. It is understood that the locking surface 658, first cam surface 650, and second cam surface 654 be coplanar, such that they form a single angle relative to the sliding surface 638a.

Figure 7:
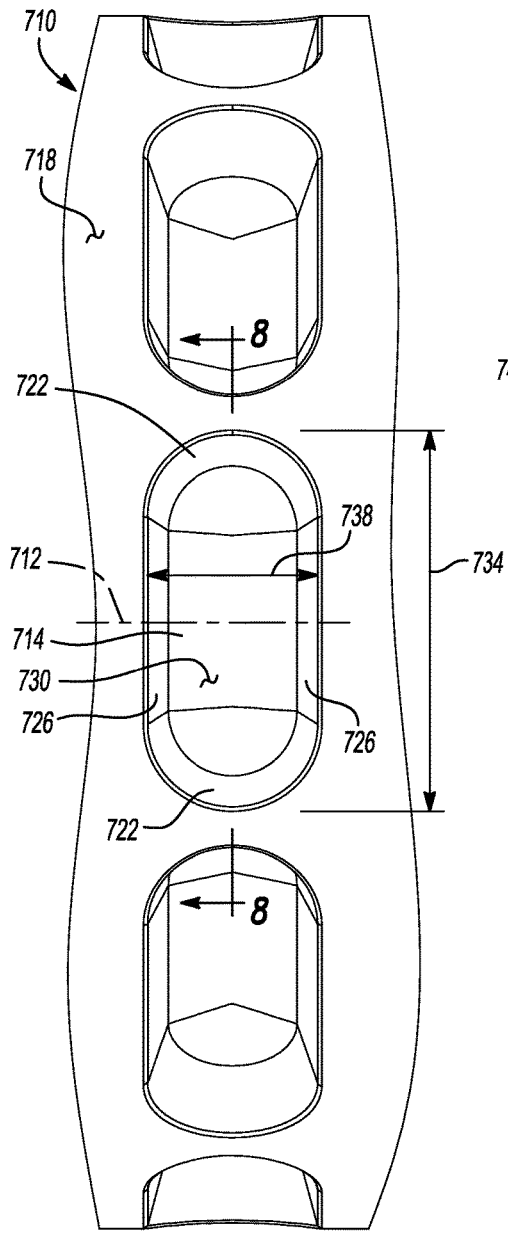
FIG. 7 is a side view of a portion of an alternately constructed locking device in accordance with the present teachings.
Figure 8:
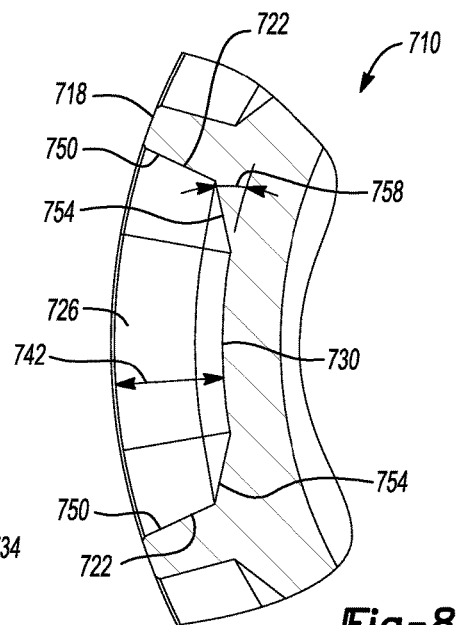
FIG. 8 is a sectional view of a portion of the locking device of FIG. 7, taken along line 8-8 shown on FIG. 7.

FIGS. 7 and 8 show another construction of a locking portion 710. The locking portion 710 can be generally similar to the second locking portion 64, 64a, 604, or 604a (FIG. 2, 4, 5, or 6 respectively), or the third locking portion 608 (FIG. 5). For example, the locking portion 710 can be coupled for common rotation with rotating member 240, 240a, 570, or 570a (FIGS. 2-6), or inner case 530 (FIG. 5). The locking portion 710 can rotate about axis 712 and can define a plurality of cavities, or recesses 714, formed in an outer surface 718 of the locking portion 710. Each of the recesses 714 can be configured to receive a locking element such as locking elements 242, 242a, 602, 606, 602a (FIGS. 2-6).

Each recess 714 can have a pair of end walls 722, a pair of side walls 726, and a recessed surface 730. Each recess 714 can have a length 734 in the circumferential direction between the end walls 722, a width 738 in the axial direction between the side walls 726, and a depth 742 between the recessed surface 730 and the outer surface 718. The length 734 can be greater than the width 738 such that the recesses 714 are generally elongated circumferentially about the locking portion 710. The elongated shape of the recesses 714 can add lash to the engagement of the locking portion 710 with the locking elements 242, 242a, 602, 606, 602a (FIGS. 2-6). This lash can allow for enough time for the locking elements 242, 242a, 602, 606, 602a (FIGS. 2-6) to move into the respective recess 714 as the locking portion 710 rotates.

The recessed surface 730 can be a curved surface that is concentric with and radially inward of the outer surface 718. The side walls 726 can be generally parallel to each other and extend radially inward from the outer surface 718 to the recessed surface 730. Opposite circumferential ends of each side wall 726 can transition into a respective one of the end walls 722.

Each end wall 722 can include a first wall portion 750 and a second wall portion 754. The first wall portion 750 can extend radially inward from the outer surface 718 and can transition into the second wall portion 754. The second wall portion 754 can extend generally radially inward from the first wall portion 750 and can transition into the recessed surface 730. The second wall portion 754 can form an angle 758 relative to the recessed surface 730 such that the second wall portion 754 is generally frustoconical in shape, with the frustum proximate to the recessed surface 730 and the base proximate to the first wall portion 750. The angle 758 can be directly related to and balanced with the angle(s) of the cam surfaces 258, 258a, 634, 650, 654 of the sleeve 66, 66a or locking device 514, 514a shown in FIGS. 2-6 respectively. For example, the angle 758 can be equal to angle 282 or angle 286 to allow for ease of engagement and disengagement while also remaining in the locked position.

Figure 9:
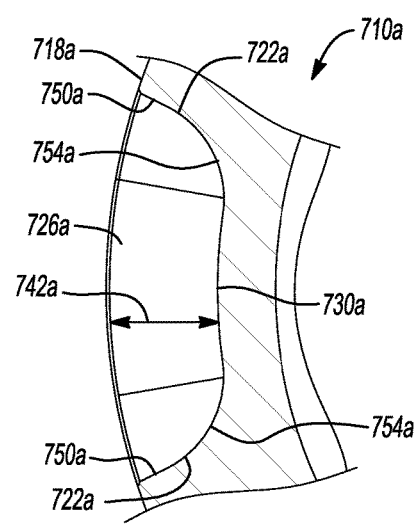
FIG. 9 is a sectional view similar to FIG. 8, illustrating a portion of a locking device of another construction in accordance with the present teachings.

FIG. 9 shows another construction of a locking portion 710a, similar to the locking portion 710 (FIGS. 7 and 8). The locking portion 710a can be similar to the locking portion 710 except as shown and otherwise described herein, with similar reference numerals referring to similar features. The second wall portion 754a of each end wall 722a can be spherical in shape and can have a diameter similar to that of the inner end of the locking elements received in the recess 714 (e.g. inner end 250, 614, 614a, or 626 of FIGS. 2-6). The first wall portion 750a of each end wall 722a can be generally similar to the first wall portion 750, except that the first wall portion 750a can transition into the curved second wall portion 754a.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A driveline component comprising:
   a differential including an outer differential case, a side gear, and a first rotating member, the outer differential case configured for rotation about a first axis and defining a plurality of circumferentially spaced apart first passages, the first rotating member coupled to the side gear for common rotation about the first axis, the first rotating member defining a plurality of first cavities radially inward of the first passages; and
   a lock having a plurality of first locking elements and a sleeve, the plurality of first locking elements being received in the plurality of first passages, the sleeve being disposed about the outer differential case and being slidable along the first axis between a first sleeve position and a second sleeve position;
   wherein when the sleeve is in the first sleeve position, the sleeve holds the plurality of first locking elements in engagement with the plurality of first cavities to non-rotatably couple the outer differential case to the first rotating member, and when the sleeve is in the second sleeve position, the sleeve allows the plurality of first locking elements to disengage the plurality of first cavities to allow relative rotation of the outer differential case and first rotating member;
   wherein the plurality of first passages extend radially through the outer differential case, and when in the first sleeve position, the sleeve limits radially outward movement of the first locking elements to maintain engagement of the first locking elements with the first cavities, and when in the second sleeve position, the sleeve permits the first locking elements to move radially outward to disengage from the first cavities; and
   wherein when the sleeve is in the second sleeve position and the outer differential case has an angular velocity above a predetermined angular velocity, a centrifugal force acts on the plurality of first locking elements to disengage the plurality of first locking elements from the plurality of first cavities.

2. The driveline component of claim 1, wherein the first locking elements have a generally cylindrical body.

3. The driveline component of claim 1, wherein the sleeve includes a first cam surface and each of the first locking elements includes a first follower surface, the first cam surface and first follower surfaces cooperating to move the first locking elements radially inward to engage the first cavities when the sleeve is moved from the second sleeve position to the first sleeve position.

4. The driveline component of claim 1, wherein each of the first cavities is elongated in a circumferential direction about the first rotating member.

5. The driveline component of claim 1, wherein each of the first cavities has a frustoconical sidewall.

6. The driveline component of claim 5, wherein the sleeve includes a first cam surface that engages the first locking elements at a first angle and the frustoconical sidewall engages the first locking elements at a second angle that corresponds to the first angle.

7. A driveline component comprising:
   a differential including an outer differential case, a side gear, and a first rotating member, the outer differential case configured for rotation about a first axis and defining a plurality of circumferentially spaced apart first passages, the first rotating member coupled to the side gear for common rotation about the first axis, the first rotating member defining a plurality of first cavities radially inward of the first passages; and
   a lock having a plurality of first locking elements and a sleeve, the plurality of first locking elements being received in the plurality of first passages, the sleeve being disposed about the outer differential case and being slidable along the first axis between a first sleeve position and a second sleeve position;
   wherein when the sleeve is in the first sleeve position, the sleeve holds the plurality of first locking elements in engagement with the plurality of first cavities to non-rotatably couple the outer differential case to the first rotating member, and when the sleeve is in the second sleeve position, the sleeve allows the plurality of first locking elements to disengage the plurality of first cavities to allow relative rotation of the outer differential case and first rotating member;
   wherein the plurality of first passages extend radially through the outer differential case, and when in the first sleeve position, the sleeve limits radially outward movement of the first locking elements to maintain engagement of the first locking elements with the first cavities, and when in the second sleeve position, the sleeve permits the first locking elements to move radially outward to disengage from the first cavities; and
   wherein the first locking elements have a generally spherical body.

8. The driveline component of claim 7, wherein the sleeve includes a first cam surface and each of the first locking elements includes a first follower surface, the first cam surface and first follower surfaces cooperating to move the first locking elements radially inward to engage the first cavities when the sleeve is moved from the second sleeve position to the first sleeve position.

9. The driveline component of claim 7, wherein each of the first cavities is elongated in a circumferential direction about the first rotating member.

10. The driveline component of claim 7, wherein each of the first cavities has a frustoconical sidewall.

11. The driveline component of claim 10, wherein the sleeve includes a first cam surface that engages the first locking elements at a first angle and the frustoconical sidewall engages the first locking elements at a second angle that corresponds to the first angle.

12. A driveline component comprising:
a differential including an outer differential case, a side gear, and a first rotating member, the outer differential case configured for rotation about a first axis and defining a plurality of circumferentially spaced apart first passages, the first rotating member coupled to the side gear for common rotation about the first axis, the first rotating member defining a plurality of first cavities radially inward of the first passages; and
a lock having a plurality of first locking elements and a sleeve, the plurality of first locking elements being received in the plurality of first passages, the sleeve being disposed about the outer differential case and being slidable along the first axis between a first sleeve position and a second sleeve position;
wherein when the sleeve is in the first sleeve position, the sleeve holds the plurality of first locking elements in engagement with the plurality of first cavities to non-rotatably couple the outer differential case to the first rotating member, and when the sleeve is in the second sleeve position, the sleeve allows the plurality of first locking elements to disengage the plurality of first cavities to allow relative rotation of the outer differential case and first rotating member;
wherein the sleeve includes a first cam surface, each of the plurality of first cavities includes a second cam surface, and each of the plurality of first locking elements includes a first follower surface and a second follower surface, the first follower surface configured to engage the first cam surface, and the second follower surface configured to engage the second cam surface, wherein when a torque above a predetermined torque is applied to the outer differential case, the second cam surface and second follower surface cooperate to move the plurality of first locking elements radially outward, and the first cam surface and first follower surface cooperate to move the sleeve from the first sleeve position to the second sleeve position.

13. The driveline component of claim 12, wherein the first locking elements have a generally cylindrical body.

14. The driveline component of claim 12, wherein the sleeve includes a first cam surface and each of the first locking elements includes a first follower surface, the first cam surface and first follower surfaces cooperating to move the first locking elements radially inward to engage the first cavities when the sleeve is moved from the second sleeve position to the first sleeve position.

15. The driveline component of claim 12, wherein each of the first cavities is elongated in a circumferential direction about the first rotating member.

16. The driveline component of claim 12, wherein each of the first cavities has a frustoconical sidewall.

17. The driveline component of claim 16, wherein the sleeve includes a first cam surface that engages the first locking elements at a first angle and the frustoconical sidewall engages the first locking elements at a second angle that corresponds to the first angle.

18. A driveline component comprising:
a differential including an outer differential case, a side gear, a first rotating member, and an inner differential case, the outer differential case configured for rotation about a first axis, the outer differential case defining a plurality of circumferentially spaced apart first passages and a plurality of circumferentially spaced apart second passages, the side gear being rotatably coupled to the inner differential case, the first rotating member coupled to the side gear for common rotation about the first axis, the first rotating member defining a plurality of first cavities radially inward of the first passages, the inner differential case being disposed within the outer differential case and rotatably coupled to the outer differential case for rotation about the first axis, the inner differential case defining a plurality of second cavities radially inward of the second passages;
a lock having a plurality of first locking elements, a sleeve, and a plurality of second locking elements the plurality of first locking elements being received in the plurality of first passages, the second locking elements being received in the second passages, the sleeve being disposed about the outer differential case and being slidable along the first axis between a first sleeve position, a second sleeve position and a third sleeve position;
wherein when the sleeve is in the first sleeve position, the sleeve holds the plurality of first locking elements in engagement with the plurality of first cavities to non-rotatably couple the outer differential case to the first rotating member, and when the sleeve is in the second sleeve position, the sleeve allows the plurality of first locking elements to disengage the plurality of first cavities to allow relative rotation of the outer differential case and first rotating member;
wherein when the sleeve is in either of the first sleeve position and second sleeve position, the sleeve holds the second locking elements in engagement with the second cavities to non-rotatably couple the outer differential case to the inner differential case, and when the sleeve is in the third sleeve position, the sleeve allows the second locking elements to disengage second cavities to allow relative rotation of the inner and outer differential cases.

19. A driveline component comprising:
a first differential case having an output portion and an input portion;
a pair of output members;
a differential gearset configured to transmit rotary power between the first differential case and the output members; and
a clutch comprising a plurality of first lock members and a control member for coordinating radially inward movement of the first lock members to non-rotatably couple the output portion to one of the pair of output members;
wherein the differential gearset includes a side gear non-rotatably coupled to the one of the pair of output members, and one of the side gear and the one of the pair of output members defines a plurality of circumferentially spaced apart first cavities, the clutch coordinating movement of the plurality of first lock members into the first cavities to non-rotatably couple the output portion to the one of the pair of output members;

wherein each of the plurality of first cavities includes a first cam surface, and each of the plurality of first lock members includes a first follower surface configured to engage the first cam surface, wherein when a torque above a predetermined torque is applied to the first differential case, the first cam surface and first follower surface cooperate to move the plurality of first lock members radially outward to allow rotation between the output portion and the one of the pair of output members.

20. The driveline component of claim 19, wherein the first differential case defines a plurality of circumferentially spaced apart first passages, each of the first lock members being disposed within one of the first passages.

21. The driveline component of claim 19, wherein the first lock members have a generally cylindrical body.

22. The driveline component of claim 19, wherein the control member is disposed about the first differential case and slidable along a first axis parallel to the pair of output members, and is slidable between a first control position and a second control position.

23. The driveline component of claim 19, wherein the control member includes a first cam surface and each of the first lock members includes a first follower surface, and the control member is movable between a first control position and a second control position, the first cam surface and first follower surfaces cooperating to move the first lock members radially inward to non-rotatably couple the output portion to the one of the pair of output members when the control member is moved from the second control position to the first control position.

24. A driveline component comprising:
a first differential case having an output portion and an input portion;
a pair of output members;
a differential gearset configured to transmit rotary power between the first differential case and the output members; and
a clutch comprising a plurality of first lock members and a control member for coordinating radially inward movement of the first lock members to non-rotatably couple the output portion to one of the pair of output members;
wherein the differential gearset includes a side gear non-rotatably coupled to the one of the pair of output members, and one of the side gear and the one of the pair of output members defines a plurality of circumferentially spaced apart first cavities, the clutch coordinating movement of the plurality of first lock members into the first cavities to non-rotatably couple the output portion to the one of the pair of output members;
wherein each of the first cavities is elongated in a circumferential direction about the one of the pair of output members.

25. The driveline component of claim 24, wherein the first differential case defines a plurality of circumferentially spaced apart first passages, each of the first lock members being disposed within one of the first passages.

26. The driveline component of claim 24, wherein the first lock members have a generally cylindrical body.

27. The driveline component of claim 24, wherein the control member is disposed about the first differential case and slidable along a first axis parallel to the pair of output members, and is slidable between a first control position and a second control position.

28. The driveline component of claim 24, wherein the control member includes a first cam surface and each of the first lock members includes a first follower surface, and the control member is movable between a first control position and a second control position, the first cam surface and first follower surfaces cooperating to move the first lock members radially inward to non-rotatably couple the output portion to the one of the pair of output members when the control member is moved from the second control position to the first control position.

29. A driveline component comprising:
a first differential case having an output portion and an input portion;
a pair of output members;
a differential gearset configured to transmit rotary power between the first differential case and the output members; and
a clutch comprising a plurality of first lock members and a control member for coordinating radially inward movement of the first lock members to non-rotatably couple the output portion to one of the pair of output members;
wherein the differential gearset includes a side gear non-rotatably coupled to the one of the pair of output members, and one of the side gear and the one of the pair of output members defines a plurality of circumferentially spaced apart first cavities, the clutch coordinating movement of the plurality of first lock members into the first cavities to non-rotatably couple the output portion to the one of the pair of output members;
wherein each of the first cavities has a frustoconical sidewall.

30. The driveline component of claim 29, wherein the sleeve includes a first cam surface that engages the first locking elements at a first angle and the frustoconical sidewall engages the first locking elements at a second angle that corresponds to the first angle.

31. The driveline component of claim 29, wherein the first differential case defines a plurality of circumferentially spaced apart first passages, each of the first lock members being disposed within one of the first passages.

32. The driveline component of claim 29, wherein the first lock members have a generally cylindrical body.

33. The driveline component of claim 29, wherein the control member is disposed about the first differential case and slidable along a first axis parallel to the pair of output members, and is slidable between a first control position and a second control position.

34. The driveline component of claim 29, wherein the control member includes a first cam surface and each of the first lock members includes a first follower surface, and the control member is movable between a first control position and a second control position, the first cam surface and first follower surfaces cooperating to move the first lock members radially inward to non-rotatably couple the output portion to the one of the pair of output members when the control member is moved from the second control position to the first control position.

35. A driveline component comprising:
a first differential case having an output portion and an input portion;
a pair of output members;
a differential gearset configured to transmit rotary power between the first differential case and the output members; and
a clutch comprising a plurality of first lock members and a control member for coordinating radially inward movement of the first lock members to non-rotatably couple the output portion to one of the pair of output members;

wherein when the first differential case has an angular velocity greater than a predetermined angular velocity, a centrifugal force acts on the plurality of first lock members to move the plurality of first lock members radially outward to allow rotation between the first differential case and the one of the output members.

36. The driveline component of claim 35, wherein the first differential case defines a plurality of circumferentially spaced apart first passages, each of the first lock members being disposed within one of the first passages.

37. The driveline component of claim 35, wherein the first lock members have a generally cylindrical body.

38. The driveline component of claim 35, wherein the control member is disposed about the first differential case and slidable along a first axis parallel to the pair of output members, and is slidable between a first control position and a second control position.

39. The driveline component of claim 35, wherein the control member includes a first cam surface and each of the first lock members includes a first follower surface, and the control member is movable between a first control position and a second control position, the first cam surface and first follower surfaces cooperating to move the first lock members radially inward to non-rotatably couple the output portion to the one of the pair of output members when the control member is moved from the second control position to the first control position.

40. A driveline component comprising:
a first differential case having an output portion and an input portion;
a pair of output members;
a differential gearset configured to transmit rotary power between the first differential case and the output members; and
a clutch comprising a plurality of first lock members and a control member for coordinating radially inward movement of the first lock members to non-rotatably couple the output portion to one of the pair of output members; wherein the first lock members have a generally spherical body.

41. The driveline component of claim 40, wherein the first differential case defines a plurality of circumferentially spaced apart first passages, each of the first lock members being disposed within one of the first passages.

42. The driveline component of claim 40, wherein the first lock members have a generally cylindrical body.

43. The driveline component of claim 40, wherein the control member is disposed about the first differential case and slidable along a first axis parallel to the pair of output members, and is slidable between a first control position and a second control position.

44. The driveline component of claim 40, wherein the control member includes a first cam surface and each of the first lock members includes a first follower surface, and the control member is movable between a first control position and a second control position, the first cam surface and first follower surfaces cooperating to move the first lock members radially inward to non-rotatably couple the output portion to the one of the pair of output members when the control member is moved from the second control position to the first control position.

45. A driveline component comprising:
a first differential case having an output portion and an input portion;
a pair of output members;
a differential gearset configured to transmit rotary power between the first differential case and the output members; and
a clutch comprising a plurality of first lock members and a control member for coordinating radially inward movement of the first lock members to non-rotatably couple the output portion to one of the pair of output members; further comprising a second differential case disposed within the first differential case and rotatably coupled to the first differential case, the differential gearset being disposed within the second differential case, the clutch further comprising a plurality of second lock members, the control member coordinating radially inward movement of the second lock members to drivingly couple the first differential case and the second differential case.

46. The driveline component of claim 45, wherein the control member is movable between first, second, and third control positions, in the first control position, the first lock members are held in a radially inward position to non-rotatably couple the first differential case and the one of the output members, and the second lock members are held in a radially inward position to non-rotatably couple the first differential case and the second differential case, in the second control position, the first lock members are free to move to a radially outward position to allow rotation between the first differential case and the one of the output members, and the second lock members are held in the radially inward position, and in the third control position, the first lock members are free to move to the radially outward position and the second lock members are free to move to a radially outward position to allow rotation between the first differential case and the second differential case.

47. The driveline component of claim 45, wherein when the first differential case has an angular velocity greater than a predetermined angular velocity, a centrifugal force acts on the plurality of second lock members to move the plurality of second lock members to the radially outward position.

48. The driveline component of claim 45, wherein the second differential case defines a plurality of circumferentially spaced second cavities, each of the plurality of second cavities includes a second cam surface, and each of the plurality of second lock members includes a second follower surface configured to engage the second cam surface, wherein when a torque above a predetermined torque is applied to the first differential case, the second cam surface and second follower surface cooperate to move the plurality of second lock members radially outward to allow rotation between the first and second differential cases.

49. The driveline component of claim 45, wherein the first differential case defines a plurality of circumferentially spaced apart first passages, each of the first lock members being disposed within one of the first passages.

50. The driveline component of claim 45, wherein the first lock members have a generally cylindrical body.

51. The driveline component of claim 45, wherein the control member is disposed about the first differential case and slidable along a first axis parallel to the pair of output members, and is slidable between a first control position and a second control position.

52. The driveline component of claim 45, wherein the control member includes a first cam surface and each of the first lock members includes a first follower surface, and the control member is movable between a first control position and a second control position, the first cam surface and first follower surfaces cooperating to move the first lock members radially inward to non-rotatably couple the output portion to the one of the pair of output members when the control member is moved from the second control position to the first control position.

* * * * *